(12) United States Patent
Miyake et al.

(10) Patent No.: US 10,843,942 B2
(45) Date of Patent: Nov. 24, 2020

(54) LIQUID TREATMENT APPARATUS

(71) Applicant: Panasonic Intellectual Property Management Co., Ltd., Osaka (JP)

(72) Inventors: Gaku Miyake, Osaka (JP); Yoshio Yamada, Hyogo (JP); Genichiro Matsuda, Nara (JP); Takahiro Kitai, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 153 days.

(21) Appl. No.: 16/093,083

(22) PCT Filed: Feb. 1, 2018

(86) PCT No.: PCT/JP2018/003366
§ 371 (c)(1),
(2) Date: Oct. 11, 2018

(87) PCT Pub. No.: WO2019/003484
PCT Pub. Date: Jan. 3, 2019

(65) Prior Publication Data
US 2020/0010340 A1    Jan. 9, 2020

(30) Foreign Application Priority Data

Jun. 26, 2017   (JP) .................................. 2017-124024

(51) Int. Cl.
*C02F 1/461* (2006.01)
*B01F 3/04* (2006.01)
(Continued)

(52) U.S. Cl.
CPC ............ *C02F 1/46109* (2013.01); *B01F 3/04* (2013.01); *B01F 5/06* (2013.01); *C02F 1/4608* (2013.01);
(Continued)

(58) Field of Classification Search
None
See application file for complete search history.

(56) References Cited

U.S. PATENT DOCUMENTS 6,558,638 B2 *  5/2003  Zadiraka ............ B01D 17/0205
                                                        422/186.04
2011/0229656 A1  9/2011  Shibata et al.
(Continued)

FOREIGN PATENT DOCUMENTS

JP    2009-235559    10/2009
JP    2012-228644    11/2012
(Continued)

OTHER PUBLICATIONS

International Search Report of PCT application No. PCT/JP2018/003366 dated Apr. 3, 2018.

*Primary Examiner* — Kishor Mayekar
(74) *Attorney, Agent, or Firm* — Wenderoth, Lind, & Ponack, L.L.P.

(57) ABSTRACT

There is provided a liquid treatment apparatus which includes a treatment tank which generates a gas phase in a swirling flow of liquid, by swirling an introduced liquid and which treats liquid by applying a pulse voltage to a generated gas phase to generate plasma, in which an insulator which is an insulating space forming member is disposed on a wall surface of one end of the treatment tank so as to prevent a swirling flow from being affected, faces the space connected via the through-hole of the insulator, and thus the first electrode is disposed.

7 Claims, 18 Drawing Sheets

(51) Int. Cl.
  *B01F 5/06*   (2006.01)
  *C02F 1/48*   (2006.01)
  *H05H 1/24*   (2006.01)
  *C02F 1/46*   (2006.01)

(52) U.S. Cl.
  CPC ............... *C02F 1/48* (2013.01); *H05H 1/24* (2013.01); *C02F 2201/46175* (2013.01)

(56) References Cited

U.S. PATENT DOCUMENTS

2014/0054241 A1    2/2014  Foret
2015/0102255 A1    4/2015  Imai et al.
2015/0336817 A1*  11/2015  Pivivarov ............ C02F 1/4672
                                                        205/742
2016/0355400 A1   12/2016  Morita

FOREIGN PATENT DOCUMENTS

| JP | 2013-119043 | 6/2013 |
| JP | 2015-056407 | 3/2015 |
| JP | 2017-073375 | 4/2017 |
| WO | 2014/171138 | 10/2014 |

* cited by examiner

LIQUID TREATMENT APPARATUS

CROSS-REFERENCE TO RELATED APPLICATIONS

This application is a U.S. national stage application of the PCT International Application No. PCT/JP2018/003366 filed on Feb. 1, 2018, which claims the benefit of foreign priority of Japanese patent application 2017-124024 filed on Jun. 26, 2017, the contents all of which are incorporated herein by reference.

TECHNICAL FIELD

The disclosure relates to a liquid treatment apparatus that electrochemically treats a liquid. More specifically, the disclosure relates to a liquid treatment apparatus that treats liquid by simultaneously causing a decomposing and sterilizing action by generating plasma in the liquid and pollutants or bacteria contained in the liquid directly coming in contact with the plasma and a decomposing and sterilizing action by ultraviolet rays, radicals, and the like generated by plasma discharge.

BACKGROUND ART

FIG. 17 illustrates an example of a conventional liquid treatment apparatus. First electrode 801 and second electrode 802 are disposed in liquid 803 (for example, water), a high voltage pulse is applied between first electrode 801 and second electrode 802 from pulse power supply 804, and liquid 803 is vaporized to generate plasma 805. At this time, pollutants and the like contained in liquid 803 are decomposed by the plasma directly coming in contact with liquid 803. At the same time, for example, even in a case where components having oxidizing power such as a hydroxyl radical (OH radical) and hydrogen peroxide are generated and these components react with the pollutants and the like contained in liquid 803, the decomposition treatment progresses. It is known that OH radicals, in particular, have high oxidizing power among the radicals generated by generation of plasma in liquid 803, and decomposition treatment of hardly decomposable organic compounds dissolved in liquid 803 can be performed.

However, in a case of the conventional liquid treatment apparatus, since not only a high applied voltage is required for vaporizing the liquid but also the generation efficiency of the plasma is low, there is a problem that it takes a long time to treat the liquid.

Accordingly, there is known a liquid treatment apparatus in which a gas introduced from the outside is interposed between both electrodes so as to improve the generation efficiency of the plasma while lowering the applied voltage (see PTL 1). In the liquid treatment apparatus (FIG. 18) described in PTL 1, gas 904 (for example, oxygen) is interposed between anode electrode 901 and cathode electrode 902 together with treatment liquid 903, and then a pulse voltage is applied to between anode electrode 901 and cathode electrode 902. Plasma is generated in gas 904 by applying the pulse voltage, and decomposition treatment on a contact surface with treatment liquid 903 progresses at the contact surface between the plasma and treatment liquid 903. According to the liquid treatment apparatus described in PTL 1, the applied voltage can be reduced as compared with a case where gas is not interposed, and the plasma can be generated efficiently to treat the liquid.

CITATION LIST

Patent Literature

PTL 1: Japanese Patent Unexamined Publication No. 2013-119043

SUMMARY

According to one aspect of the disclosure, there is provided a liquid treatment apparatus including: a tubular treatment tank of which a sectional shape orthogonal to a central axis is a circular shape; an insulating space forming member which is disposed at a side of one end of the central axis of the treatment tank and has a through-hole and a space connected to the treatment tank via the through-hole; a first electrode which is disposed in contact with the space; a second electrode which is disposed on a side of the other end of the central axis of the treatment tank; a power supply which applies a voltage between the first electrode and the second electrode; and a liquid introduction port which swirl liquid in the treatment tank by introducing the liquid from a tangential direction of the circular shape of the treatment tank, and generate a gas phase in a swirling flow of the liquid, in which plasma is generated in the gas phase reaching the space and the through-hole, thereby causing the liquid to generate as a treatment liquid, by applying the voltage from the power supply between the first electrode and the second electrode.

According to the liquid treatment apparatus of the aspect of the invention, the liquid is vaporized in the swirling flow in the treatment tank to generate a gas phase, and a pulse voltage is applied to the generated gas phase to generate plasma. Therefore, since it is unnecessary to vaporize the liquid by applying a voltage, it is possible to generate plasma with a small electric power, and it is possible to efficiently and rapidly perform the treatment of the liquid, and since the electrode does not protrude in the swirling flow and the gas phase and thus the swirling flow and the gas phase can be generated stably, it is possible to stably generate the plasma to efficiently treat the liquid and stably generate the plasma for a long period of time.

DESCRIPTION OF EMBODIMENT

Figure 1:
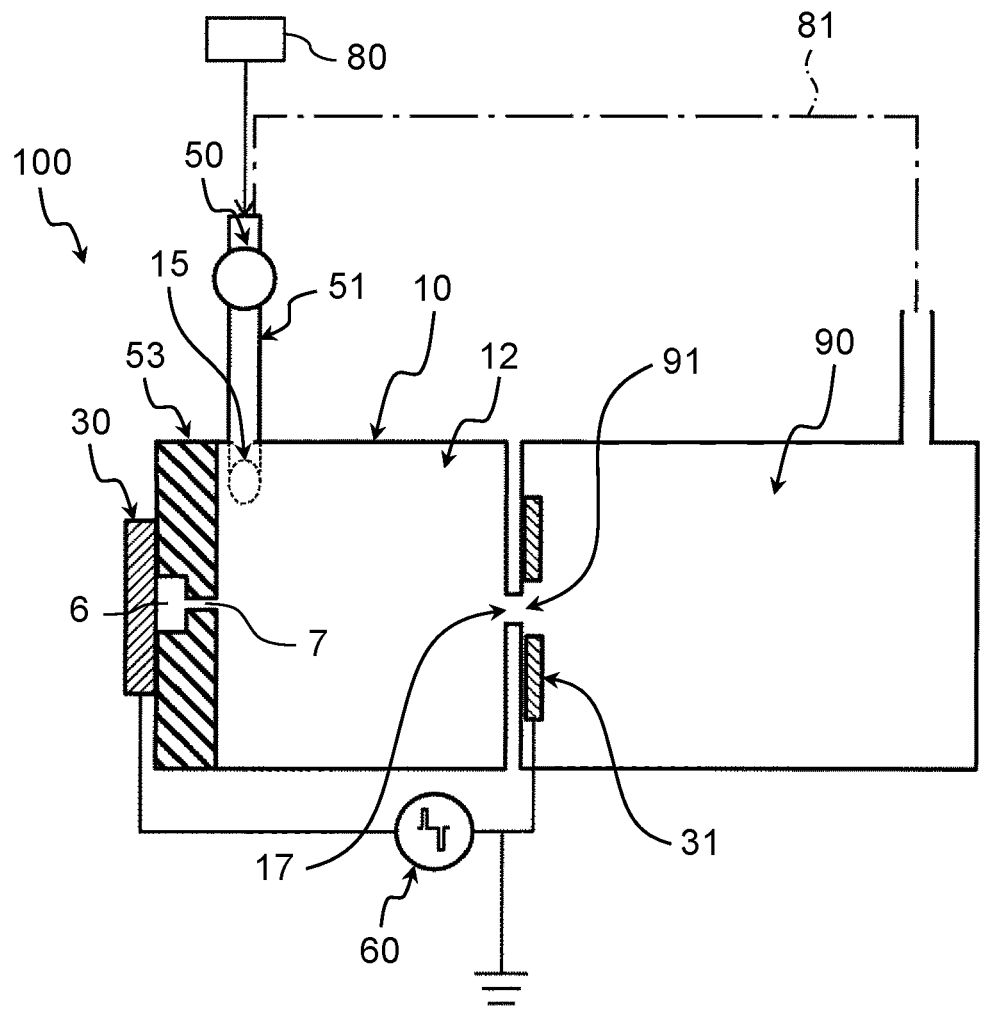
FIG. 1 is a side sectional view illustrating a configuration of a liquid treatment apparatus according to Exemplary embodiment 1 of the disclosure.
Figure 1:
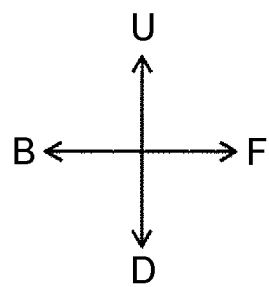

Prior to describing the Exemplary embodiment, conventional problems in the related art will be briefly described.

In the liquid treatment apparatus described in PTL1, although there is a function of generating a swirling flow by introduced liquid and holding the gas introduced from the outside at a rotation center, since the two electrodes are disposed so as not to follow the swirl axis or the gas flow, the gas flow of the gas to be introduced is disturbed by the two electrodes, and thus a problem is generated that the stable discharge is hindered.

In view of the above, an object of the disclosure is to provide a liquid treatment apparatus that can generate plasma to efficiently treat a liquid and stably generate plasma for a long period of time.

Exemplary Embodiment

Hereinafter, liquid treatment apparatus 100 according to the Exemplary embodiment of the disclosure will be described in detail with reference to the drawings. The same or corresponding portions in the drawings are denoted by the same reference numerals, and description thereof will not be repeated. So as to make the explanation easy to understand, in the drawings referred to below, the configuration is simplified or schematically illustrated, and some constituent members are omitted. In addition, the dimensional ratio between the constituent members illustrated in each drawing does not necessarily indicate the actual size ratio.

[Overall Configuration]

First, the overall configuration of liquid treatment apparatus 100 according to Exemplary embodiment 1 will be described. FIG. 1 is a side sectional view illustrating a configuration of liquid treatment apparatus 100 according to Exemplary embodiment 1 of the disclosure. In the following drawings, arrow F indicates a front direction of liquid treatment apparatus 100 and arrow B indicates a rear direction thereof. Arrow U indicates an upper direction thereof and arrow D indicates a lower direction thereof. Arrow R indicates a right direction thereof as viewed from the rear direction, and arrow L indicates a left direction thereof as viewed from the rear direction.

Liquid treatment apparatus 100 illustrated in FIG. 1 indicates a state of being connected to storage tank 90. Liquid treatment apparatus 100 treats a liquid by discharging in a liquid. In this Exemplary embodiment, a case where an aqueous solution in which a pollutant is dissolved is treated will be described. In storage tank 90, the treatment liquid treated by liquid treatment apparatus 100 is stored.

Liquid treatment apparatus 100 includes at least treatment tank 12, first electrode 30, second electrode 31, and power supply 60. More specifically, liquid treatment apparatus 100 includes apparatus main body 10, liquid supplier 50, and power supply 60. Apparatus main body 10 includes treatment tank 12, introduction portion 15 functioning as an example of a liquid introduction port, discharge unit 17, first electrode 30, and second electrode 31.

Treatment tank 12 is a portion that treats a liquid (for example, water) introduced therein. Treatment tank 12 has a columnar treatment chamber whose front sectional shape is circular. Introduction portion 15 is disposed at one end of treatment tank 12 and discharge unit 17 is disposed at the other end of treatment tank 12. Introduction portion 15 introduces the liquid into treatment tank 12 from a tangential direction of a circular sectional shape orthogonal to central axis X1 of treatment tank 12. Introduction portion 15 communicates with liquid supplier 50 via pipe 51. Discharge unit 17 discharges treatment liquid L2 treated by treatment tank 12 from treatment tank 12. In this Exemplary embodiment, discharge unit 17 is connected to intake port 91 of storage tank 90. The treatment liquid discharged from discharge unit 17 is stored in storage tank 90. The material of treatment tank 12 may be an insulator or a conductor. In a case of a conductor, it is necessary to interpose an insulator between first electrode 30 and second electrode 31.

First electrode 30 has a plate shape, for example, a disk shape, and is disposed on the side of a wall surface opposed to a wall surface on which discharge unit 17 of treatment tank 12 is formed via insulator 53 made of, for example, an insulating plate. Insulator 53 functions as an example of an insulating space forming member. Second electrode 31 is disposed in the vicinity of discharge unit 17. As an example, in FIG. 1, second electrode 31 is fixed to the outside of the wall surface where discharge unit 17 of treatment tank 12 is formed, specifically, an inner wall surface in storage tank 90. Power supply 60 is connected to first electrode 30, and second electrode 31 is grounded. A high voltage pulse voltage is applied to first electrode 30 and second electrode 31 by power supply 60.

Liquid supplier 50 is, for example, a pump that supplies a liquid (for example, water) into treatment tank 12. Liquid supplier 50 is connected to pipe 51. One end of pipe 51 is connected to introduction portion 15, and the other end of pipe 51 is connected in a form capable of circulating stored water containing a treatment liquid in a liquid supply source (for example, water tank 80 or a water supply) (not illustrated) or storage tank 90 (refer to pipe for circulation 81 or the like indicated by one-dot chain line in FIG. 1).

Power supply 60 applies a high voltage of the pulse voltage between first electrode 30 and second electrode 31.

Power supply 60 can apply a so-called bipolar pulse voltage that alternately applies a positive pulse voltage and a negative pulse voltage.

[Apparatus Main Body]

Figure 2:
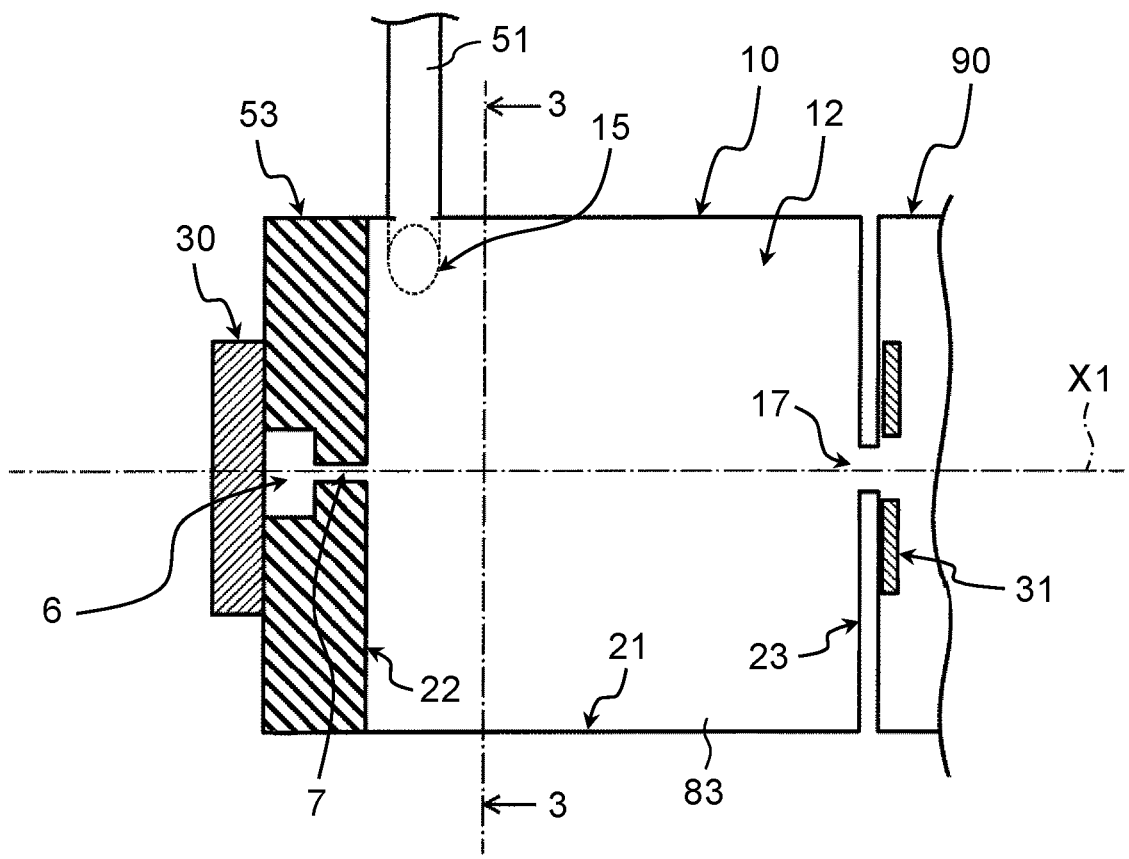
FIG. 2 is a side sectional view illustrating apparatus main body 10.
Figure 2:
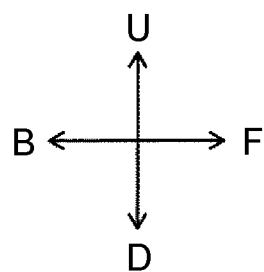

Next, apparatus main body 10 will be described in detail. FIG. 2 is a side sectional view illustrating apparatus main body 10.

Treatment tank 12 has first inner wall 21, second inner wall 22, and third inner wall 23. First inner wall 21 is a tubular wall portion. Second inner wall 22 is provided at one end portion, for example, a left end portion, of first inner wall 21 in FIG. 2. Third inner wall 23 is provided at the other portion, for example, a right end portion of first inner wall 21 in FIG. 2. Second inner wall 22 and third inner wall 23 are substantially circular in a side view. First inner wall 21, second inner wall 22, and third inner wall 23 constitute substantially columnar accommodation space 83 in treatment tank 12. A central axis of first inner wall 21, that is, an imaginary central axis of a substantially columnar accommodation space 83 configured in treatment tank 12 is set to as central axis X1.

On second inner wall 22, first electrode 30 is supported via insulator 53. In other words, second inner wall 22 is configured with the inner wall of disk-shaped insulator 53 fixed to the one end of treatment tank 12. First electrode 30 is in the form of a plate, is fixed to the central portion of the outer wall surface of insulator 53, and is disposed adjacent to treatment tank 12 with insulator 53 interposed therebetween. Insulator 53 is provided with space 6 and through-hole 7, and the center of through-hole 7 is disposed to coincide with central axis X1.

Figure 3:
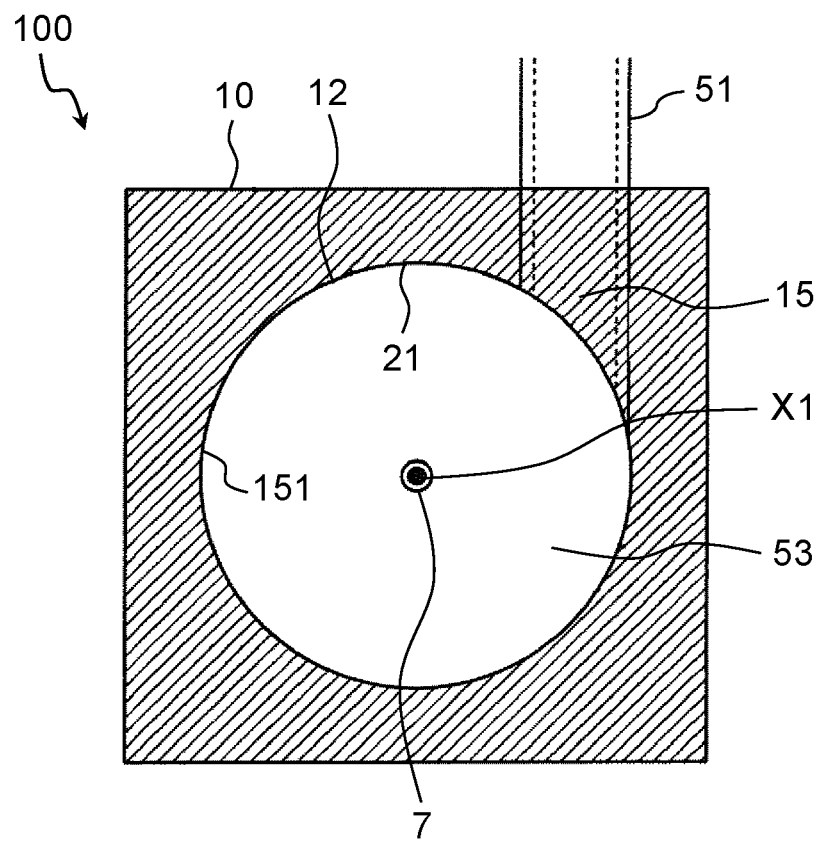
FIG. 3 is a view illustrating a vicinity of a section taken along line 3-3 of FIG. 2.
Figure 3:
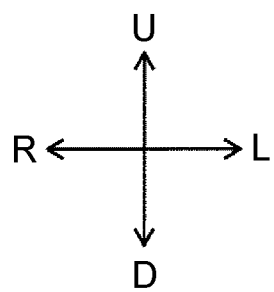

Introduction portion 15 penetrates apparatus main body 10, and one opening end is formed on first inner wall 21. In the side view, introduction portion 15 is disposed at a position adjacent to second inner wall 22. In addition, FIG. 3 is a view illustrating the vicinity of a section taken along line 3-3 of FIG. 2. Introduction portion 15 is disposed on the wall surface of first inner wall 21.

Discharge unit 17 penetrates, for example, the central portion of third inner wall 23. Discharge unit 17 is formed such that the central axis thereof coincides with central axis X1.

Second electrode 31 is a plate-shaped metal member, and opening portion 311 (FIG. 4) is formed on the central portion. Opening portion 311 has a circular shape and the central axis thereof is formed so as to coincide with central axis X1.

[Operation]

Figure 4:
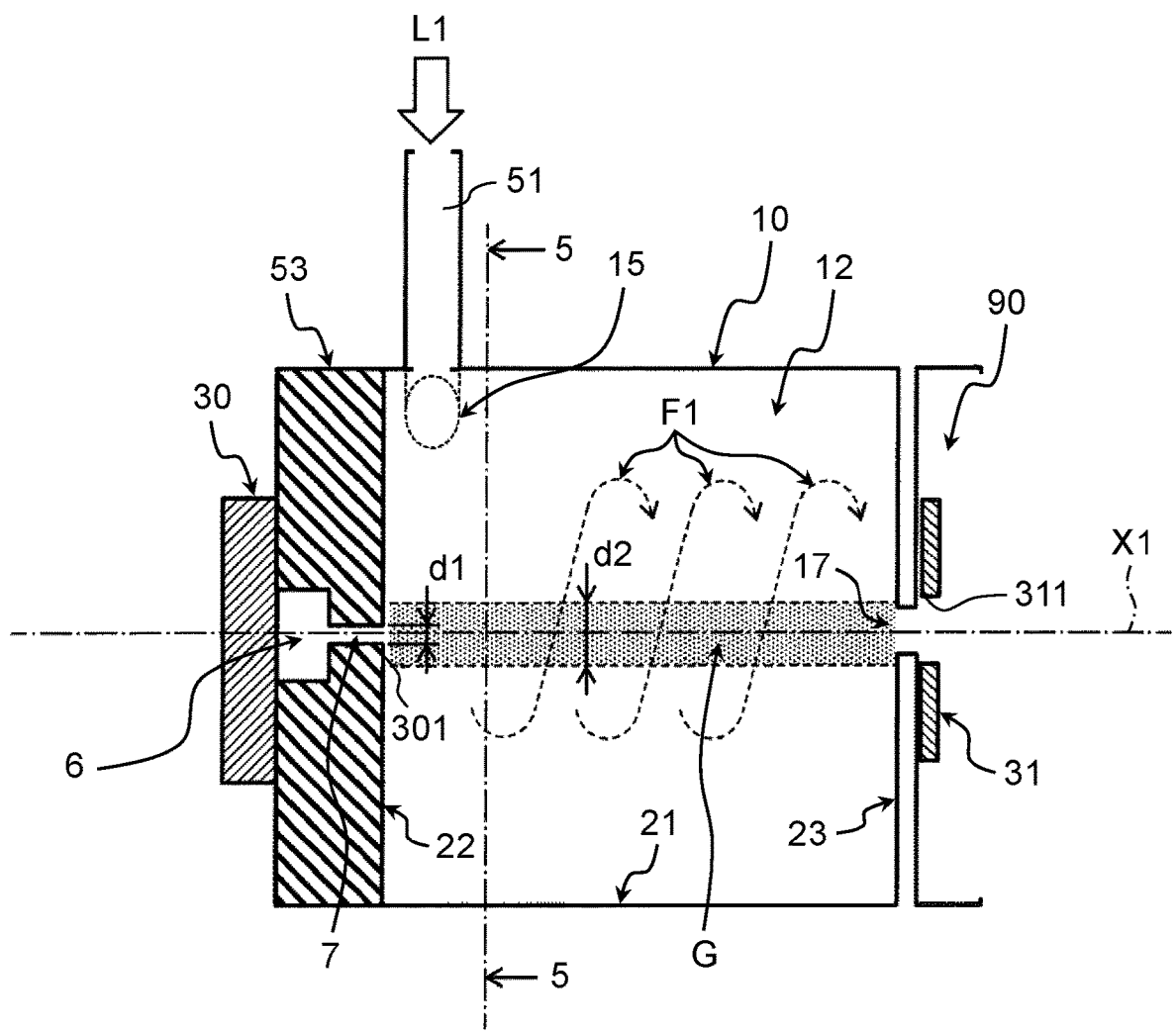
FIG. 4 is a side sectional view illustrating a state where a swirling flow is generated in treatment tank 12 and no voltage is applied.
Figure 4:
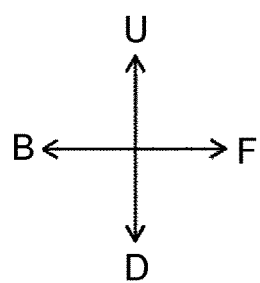

Next, the operation of liquid treatment apparatus 100 will be described. Hereinafter, for the sake of convenience of explanation, a state (FIG. 4) where gas phase G is generated inside treatment tank 12 and a state where the pulse voltage is applied to gas phase G to generate plasma P (FIG. 6) will be described separately in separate drawings. FIG. 4 is a side sectional view illustrating a state where swirling flow F1 is generated in treatment tank 12 and no pulse voltage is applied.

First, as illustrated in FIG. 4, when liquid (for example, water) L1 is introduced from introduction portion 15 to treatment tank 12 at a predetermined pressure through a pump or the like from the tap water or by sucking liquid L1 in storage tank 90 by the pump, liquid L1 moves toward the right side in FIG. 4 from introduction portion 15 while generating swirling flow F1 along first inner wall 21. Swirling flow F1 that is moved to the right side in FIG. 4 while swirling moves toward discharge unit 17.

Due to swirling flow F1, the pressure in the vicinity of central axis X1 drops to the saturated water vapor pressure or less, a portion of liquid L1 vaporizes, and gas phase G is generated in the vicinity of central axis X1. Gas phase G is generated in the vicinity of the swirling center, more specifically, from right end portion 301 of insulator 53 which is second inner wall 22 along central axis X1 to the left end of third inner wall 23.

At the center of insulator 53 at right end portion 301 of insulator 53, through-hole 7 is provided so as to reach the vicinity of first electrode 30. In the vicinity of first electrode 30 of through-hole 7, for example, columnar space 6 having an inner diameter larger than that of through-hole 7 is formed so as to communicate with through-hole 7 and disposed so as to face first electrode 30. Since this space 6 communicates with gas phase G through through-hole 7, gas phase G is generated by swirling flow F1 and at the same time the liquid containing in space 6 and through-hole 7 is sucked and discharged to a side of treatment tank 12 through through-hole 7, space 6 and through-hole 7 are filled with gas of the same gas component at the same pressure as that of gas phase G and the surface of first electrode 30 facing space 6 comes in contact with the gas.

Gas phase G is swirling in the same direction as swirling flow F1 by swirling flow F1 in contact therewith. Gas phase G which is swirling is sheared by microbubbles or nanobubbles by receiving the resistance of the liquid in storage tank 90 in the vicinity of discharge unit 17 and is diffused from discharge unit 17 to storage tank 90 via intake port 91 connected to discharge unit 17.

Figure 5:
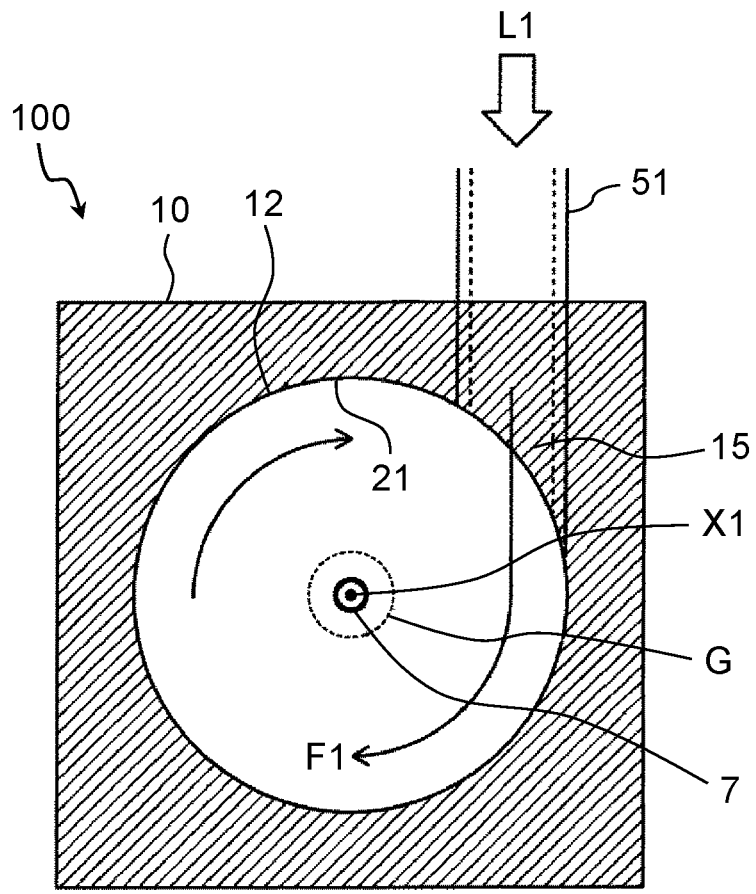
FIG. 5 is a view illustrating a vicinity of a section illustrating a state of the swirling flow and gas phase at line 5-5 of FIG. 4.
Figure 5:
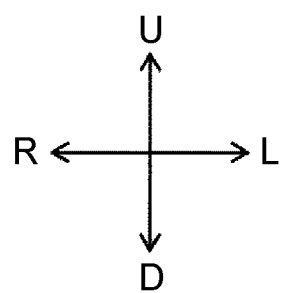

FIG. 5 is a view illustrating the vicinity of a section taken along line 5-5 of FIG. 4. Introduction portion 15 is disposed on the wall surface of first inner wall 21 and illustrates how swirling flow F1 is generated along first inner wall 21. By this swirling flow F1, gas phase G is generated around central axis X1. In other words, as described with reference to FIG. 4, when liquid L1 is introduced from introduction portion 15 into treatment tank 12 at a predetermined pressure, liquid L1 generates clockwise swirling flow F1 in FIG. 5 along first inner wall 21. When liquid L1 is swirled inside treatment tank 12, the pressure around the center of swirling flow F1, that is, near central axis X1 drops to the saturated water vapor pressure or less, and when water vapor is generated by a portion of liquid L1 bring vaporized near central axis X1, gas phase G is generated.

Figure 6:
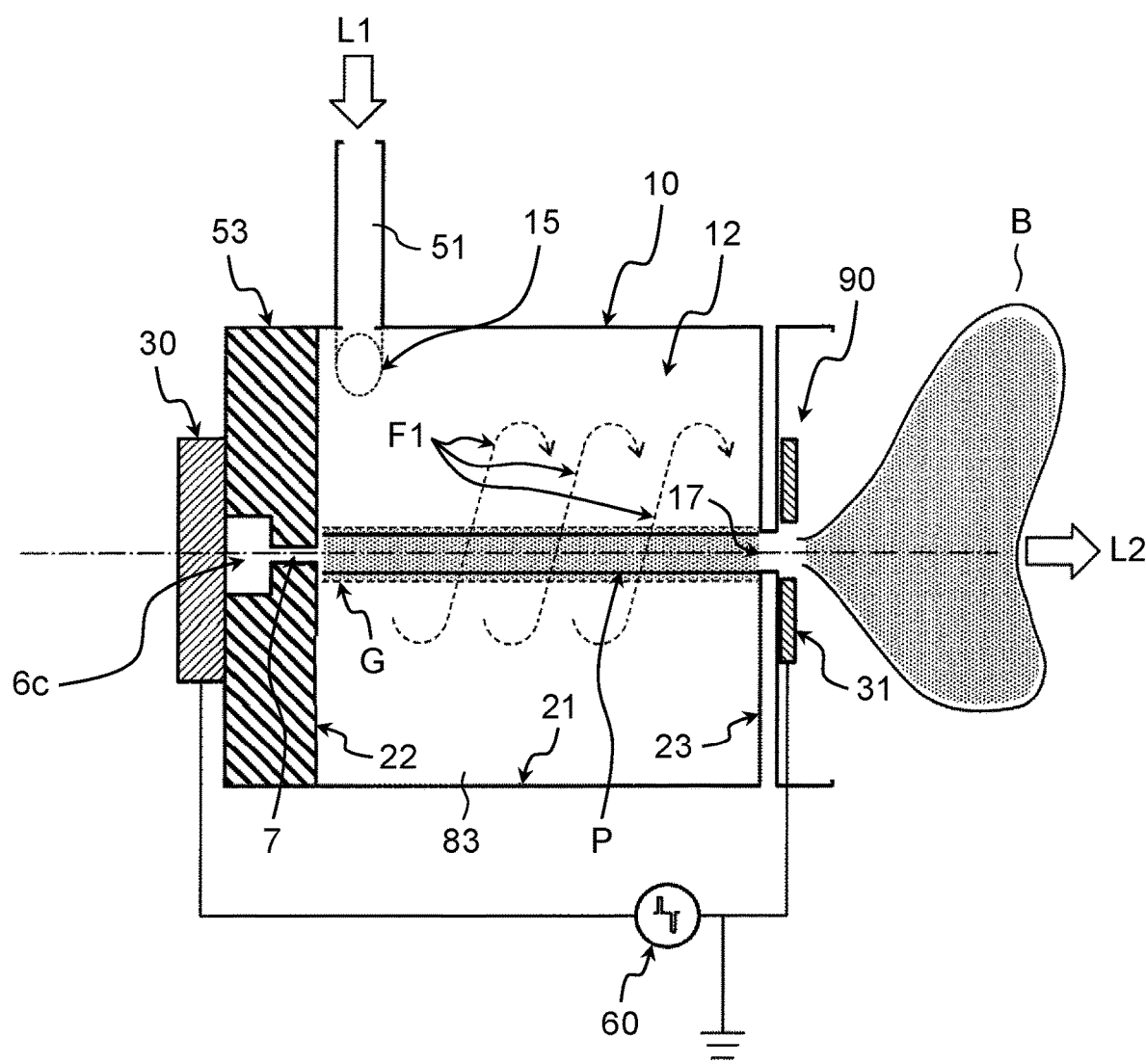
FIG. 6 is a side sectional view illustrating a state where a swirling flow is generated inside treatment tank 12 and a voltage is being applied.
Figure 6:
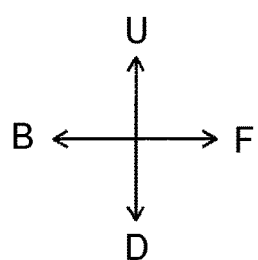

FIG. 6 is a side sectional view illustrating a state where swirling flow F1 is generated in treatment tank 12 and a pulse voltage is applied. As illustrated in FIG. 6, in a state where gas phase G vaporized from liquid L1 is generated from second inner wall 22 to third inner wall 23, by power supply 60, a high voltage of the pulse voltage is applied between first electrode 30 and second electrode 31. When the high voltage of the pulse voltage is applied to first electrode 30 and second electrode 31, plasma P is generated in space 6, through-hole 7, and gas phase G, and radicals (OH radicals, or the like) or ions are generated. The radicals or ions are dissolved from gas phase G to a side of swirling flow F1 to decompose the pollutant dissolved in liquid L1. In addition, plasma P in gas phase G in the vicinity of discharge unit 17 receives a resistance of the liquid in storage tank 90, and thus a large amount of bubble B containing OH radicals and the like is generated. In this manner, treatment liquid L2 which is in a state of being treated with OH radicals or the like generated by plasma P and containing bubbles B containing OH radicals and the like is discharged from discharge unit 17 toward storage tank 90.

Upon the occurrence of plasma discharge, ultraviolet rays are generated at the same time. When pollutants or bacteria are irradiated with the generated ultraviolet rays, it is possible to exert decomposition and sterilizing action. In addition, when hydrogen peroxide water generated in the treatment liquid is irradiated with ultraviolet rays, OH radicals are generated as described above, thereby also exerting the decomposition and sterilizing action.

By the operation described above, it is possible to efficiently generate plasma P and rapidly treat liquid L1.

Next, the reason why space 6 and through-hole 7 are necessary will be described using the comparative example of FIGS. 7A to 7D and the comparative example of FIG. 8A.

Figure 7A:
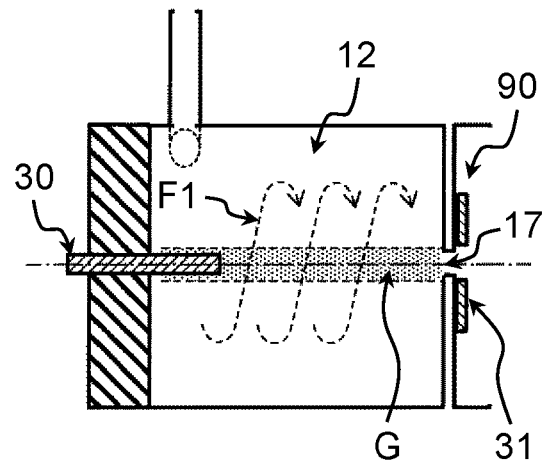
FIG. 7A is a side sectional view illustrating an example in a case where the dispositions and the thicknesses of the first electrodes are different from each other.
Figure 8A:
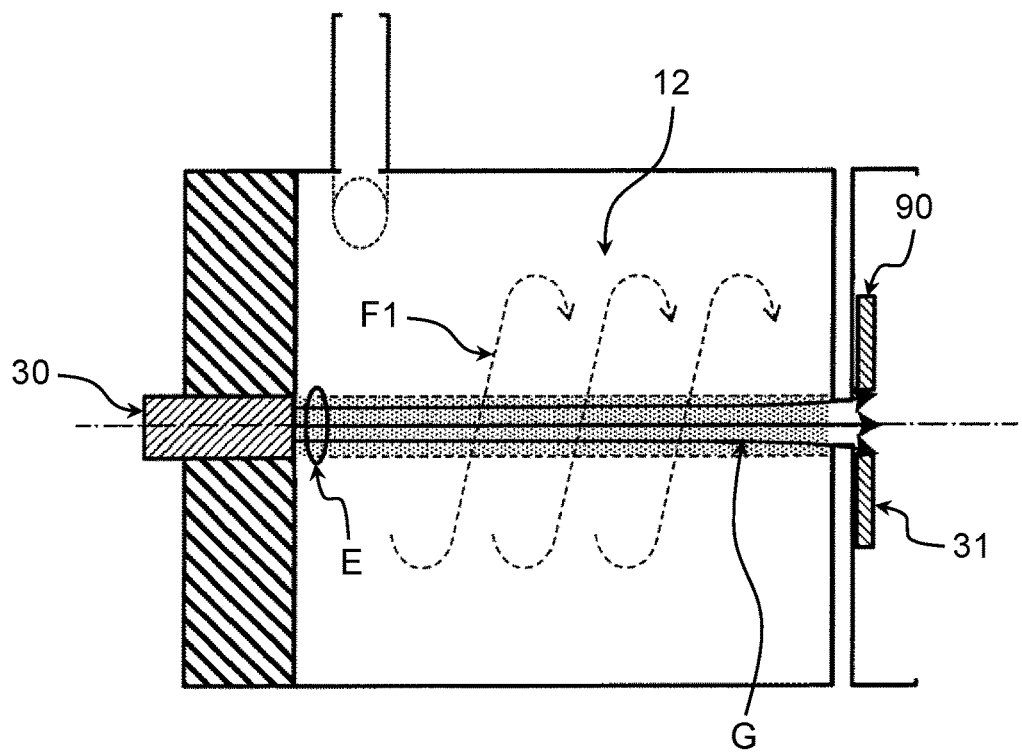
FIG. 8A is a side sectional view illustrating electric force lines from the first electrode.

FIG. 7A illustrates a case where space 6 and through-hole 7 are absent and first electrode 30 protrudes into treatment tank 12.

In this configuration, since first electrode 30 enters swirling flow F1 or gas phase G, the flow of swirling flow F1 or gas phase G is disturbed and the discharge becomes unstable.

Figure 7C:
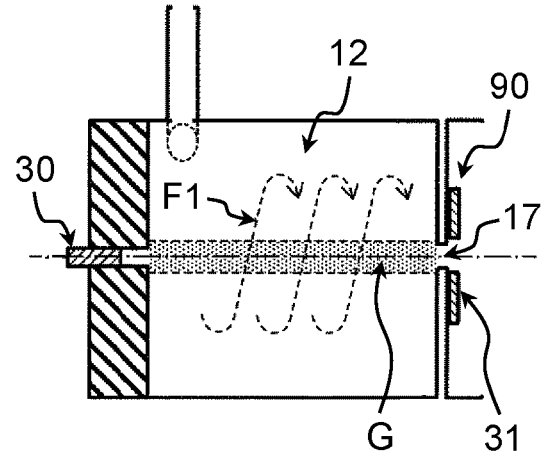
FIG. 7C is a side sectional view illustrating an example in a case where the dispositions and the thicknesses of the first electrodes are different from each other.
Figure 7B:
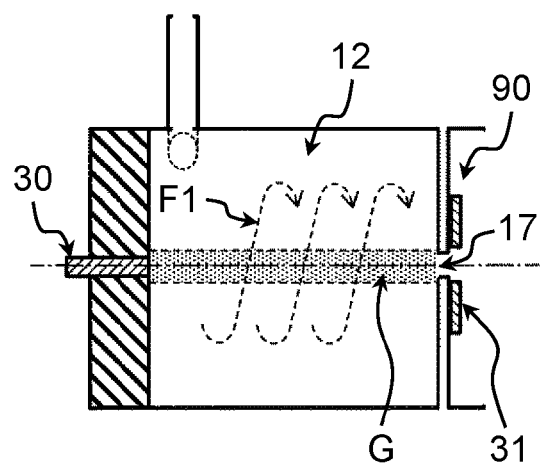
FIG. 7B is a side sectional view illustrating an example in a case where the dispositions and the thicknesses of the first electrodes are different from each other.

On the other hand, in FIG. 7B, since first electrode 30 does not protrude into treatment tank 12, swirling flow F1 and gas phase G do not become unstable, so the discharge is stabilized.

However, if facilities are operated for a long time, first electrode 30 gradually wears, becomes a state of being illustrated in FIG. 7C, and the distance between the electrodes changes, so the discharge is not stable.

Figure 7D:
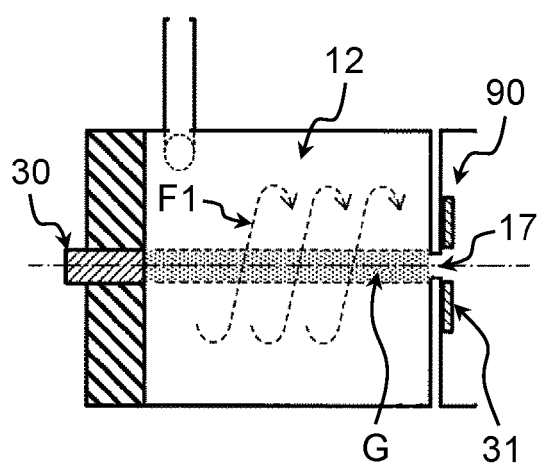
FIG. 7D is a side sectional view illustrating an example in a case where the dispositions and the thicknesses of the first electrodes are different from each other.

As a countermeasure against wear of the electrode, as illustrated in FIG. 7D, it is conceivable to thicken first electrode 30. However, in this configuration, as illustrated in FIG. 8A, the density of electric force lines E at the left end portion of gas phase G becomes small and the electric field strength is small so that the discharge hardly occurs.

Figure 8B:
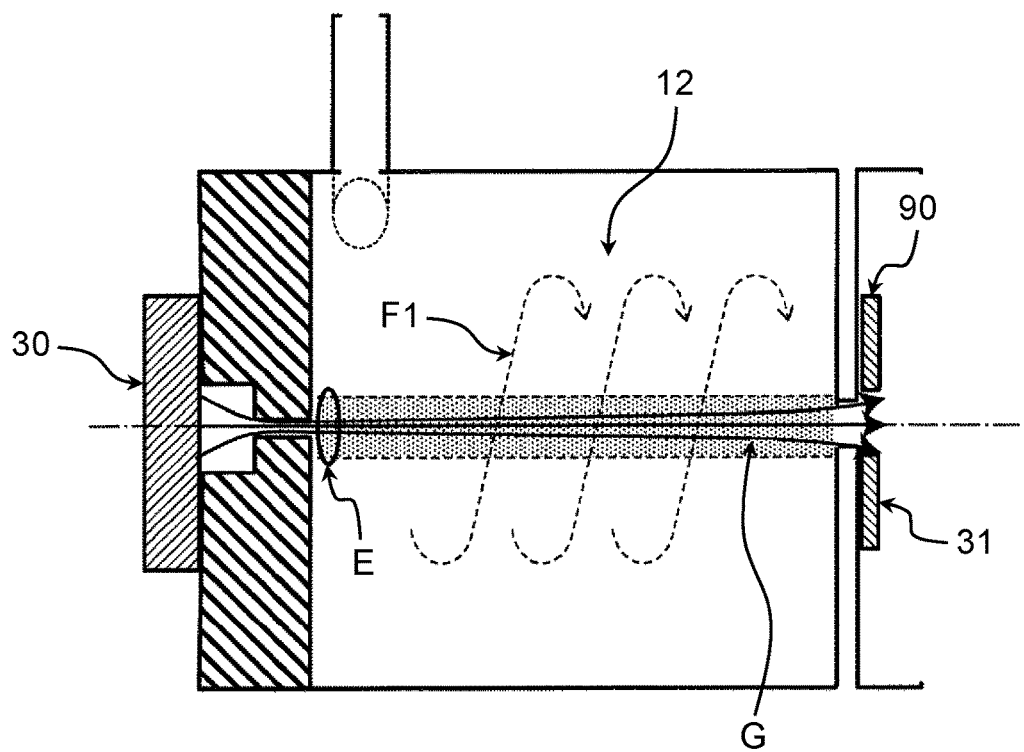
FIG. 8B is a side sectional view illustrating electric force lines from the first electrode.

With respect to these comparative examples, an Exemplary embodiment of the disclosure, in which space 6 and through-hole 7 are provided, is illustrated in FIG. 8B. In FIG. 8B, since electric force lines E are concentrated at the left end portion of gas phase G in the narrow space of through-holes 7 and space 6 surrounded by insulator 53, the density of electric force lines E is increased, and thus the electric field strength increases, discharge is likely to be generated. In this manner, by providing space 6 and through-hole 7, since it is possible to use a thick electrode with little electrode wearing without disturbing gas phase G, and at the same time, it is possible to keep the electric field intensity high, the discharge can be stably generated.

Next, the size of treatment tank 12 will be described. In the Exemplary embodiment, a voltage is applied to gas phase G generated in treatment tank 12 using power supply 60 to generate a discharge. As power supply 60, a pulse power supply having an output voltage of 1 kV or more and 10 kV or less can be used. In a case where the power supply voltage is 1 kV, if the distance between first electrode 30 and second electrode 31 is 5 mm or less, it is possible to generate a discharge in gas phase G, but if the distance therebetween becomes larger than this distance, the discharge cannot be generated. In addition, in a case where the power supply voltage is 10 kV, discharge can be generated if it is 30 mm or less. Since the contact area between the liquid and plasma P increases as the distance between the electrodes increases, efficient treatment becomes possible.

As described above, the distance between first electrode 30 and second electrode 31 is preferably 5 mm or more and 30 mm or less. The distance between first electrode 30 and second electrode 31 is the sum of the lengths between treatment tank 12, through-hole 7, and space 6. Although details will be described below, since space 6 and through-hole 7 each require a length of 0.5 mm, the length of treatment tank 12 is preferably 4 mm or more and 29 mm or less. If the diameter of treatment tank 12 is too small, swirling flow cannot be generated well, and conversely, if the diameter of treatment tank 12 is too large, the speed of the swirling flow becomes slow and it is impossible to generate gas phase G well. In a case where the length of treatment tank 12 is 4 mm or more and 29 mm or less, the diameter of treatment tank 12 is preferably 5 mm or more and 30 mm or less. At this time, the diameter of gas phase G is about 0.5 mm or more and 2 mm or less.

Next, the size of through-hole 7 will be described.

If diameter d1 of through-hole 7 is too large, suction of liquid L1 containing in space 6 by swirling flow F1 is insufficient, liquid L1 backflows from treatment tank 12, and liquid L1 remains in the space in contact with first electrode 30. In this case, a phenomenon occurs in which the electrical state changes and a stable discharge cannot be obtained. Therefore, diameter d1 of through-hole 7 is preferably smaller than diameter d2 of gas phase G. Specifically, when diameter d1 of through-hole 7 exceeds 50% of diameter d2 of gas phase G, the influence on a state of generation of gas phase G becomes large, undulation occurs in gas phase G, fluctuations periodically occur, and plasma generation becomes unstable. On the contrary, when diameter d1 of through-hole 7 becomes smaller than 25% of diameter d2 of gas phase G, a space between first electrode 30 and second electrode 31 approaches a state of being blocked by the insulator, and a phenomenon occurs in which discharge hardly occurs. Therefore, diameter d1 of through-hole 7 is preferably 25% or more and 50% or less of diameter d2 of gas phase G. Therefore, as an example, when diameter d2 of gas phase G is 2 mm, diameter d1 of through-hole 7 is preferably 0.5 mm or more and 1 mm or less.

As the length of through-hole 7, a minimum length of 0.5 mm is necessary so as to maintain the strength and insulation, and if the length of through-hole 7 is too long since the electric power necessary for stably generating plasma P becomes large, the length of through-hole 7 is preferably 3 mm or less. In other words, the length of through-hole 7 is preferably 0.5 mm or more and 3 mm or less.

Next, the size of space 6 will be described.

In a case where the volume of space 6 is 0, even if a thick electrode is used as first electrode 30 as a countermeasure against electrode wear of first electrode 30, only the portion in contact with the opening portion of through-hole 7 of first electrode 30 is worn in a hole shape, and if it is operated for a long time, a problem that the discharge becomes unstable is generated. So as to avoid the problem, 0.5 mm is required as the length of space 6. Conversely, if the length of space 6 becomes too long, since the electric power necessary for stably generating plasma P increases, the length of space 6 is preferably 3 mm or less. In other words, the length of space 6 is preferably 0.5 mm or more and 3 mm or less.

The inner diameter of space 6 needs to be larger than the inner diameter of through-hole 7 so as to prevent electrode wearing. Specifically, the inner diameter of space 6 is preferably 1 mm or more and 3 mm or less. The reason why the inner diameter of space 6 is 3 mm or less is that when the inner diameter of space 6 exceeds 3 mm, suction of liquid L1 containing in space 6 by swirling flow F1 is insufficient and the discharge becomes unstable.

With respect to each shape of through-hole 7 and space 6, for example, so as to uniformly and stably generate plasma P around central axis X1, preferably each shape of through-hole 7 and space 6 is symmetrical around central axis X1 and is a cylindrical shape.

According to the Exemplary embodiment described above, liquid L1 is vaporized in swirling flow F1 in treatment tank 12 to generate gas phase G, and the pulse voltage is applied to generated gas phase G to generate plasma P. Therefore, since it is unnecessary to vaporize liquid L1 by voltage application, plasma P can be generated with a small voltage (that is, low electric power), plasma P can be efficiently generated and the treatment of liquid L1 can be quickly and efficiently performed. In addition, since first electrode 30 and second electrode 31 are disposed outside swirling flow F1, first electrode 30 and second electrode 31 do not protrude into swirling flow F1 and gas phase G, and there is the effect that there is no factor impeding the stable discharge, such as disturbing swirling flow F1 or making gas phase G unstable. As a result, since the swirling flow and the gas phase can be stably generated, it is possible to stably generate plasma P to efficiently treat liquid L1, stably generate plasma P for a long time, and the facilities can be operated stably for a long time.

Modification Example

Modification examples of Exemplary embodiment will be described below. Space below is merely different in shape and the like from space 6 described above, and the size condition is applied as it is.

Figure 9:
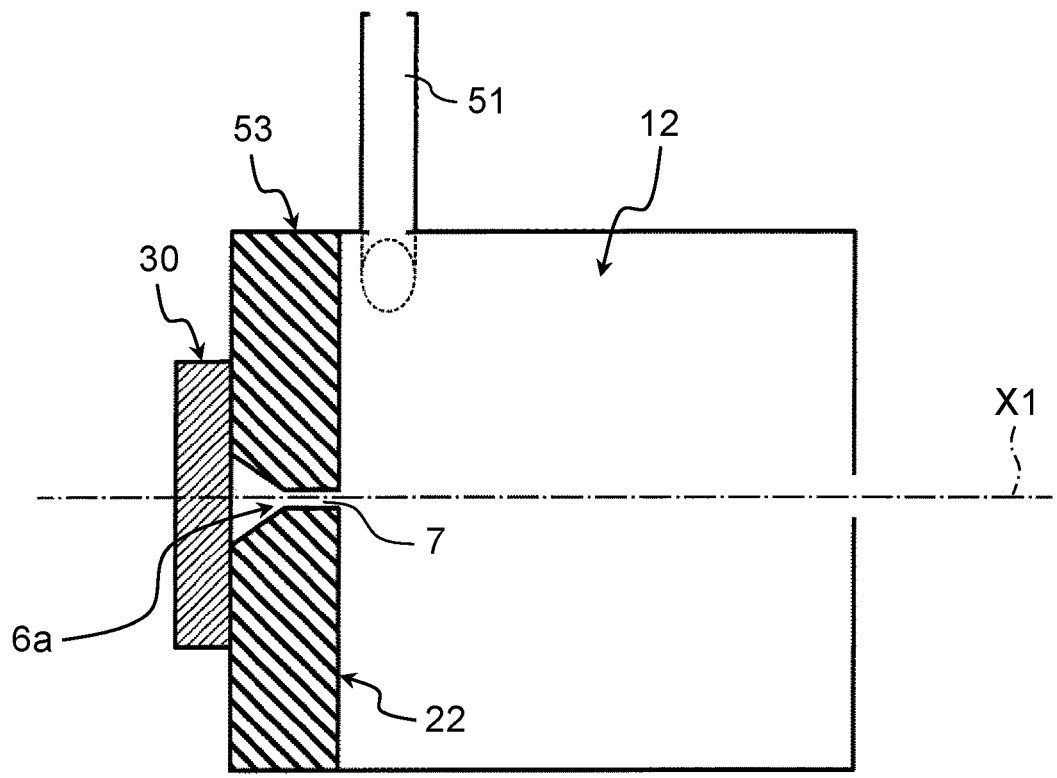
FIG. 9 is a side sectional view illustrating a shape of a modification example of a space.
Figure 9:
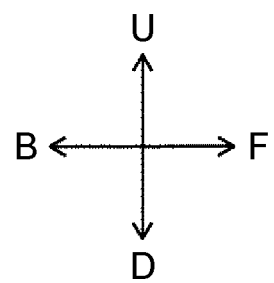

FIG. 9 is a side sectional view illustrating a modification example in which the shape of space 6 is changed from a columnar shape to conical shape space 6a. Space 6a is formed in a conical shape within insulator 53 so as to spread from an opening of a side of a first end portion of through-hole 7 toward an end surface of a side of a first end portion of insulator 53, and the opening on the side of the first end portion is closed by first electrode 30. The shape of space 6 is not limited to this shape.

By making the shape of space 6 conical in this manner, liquid L1 containing in space 6 by swirling flow F1 is easily sucked, and there is an effect that the discharge is stabilized.

Figure 10:
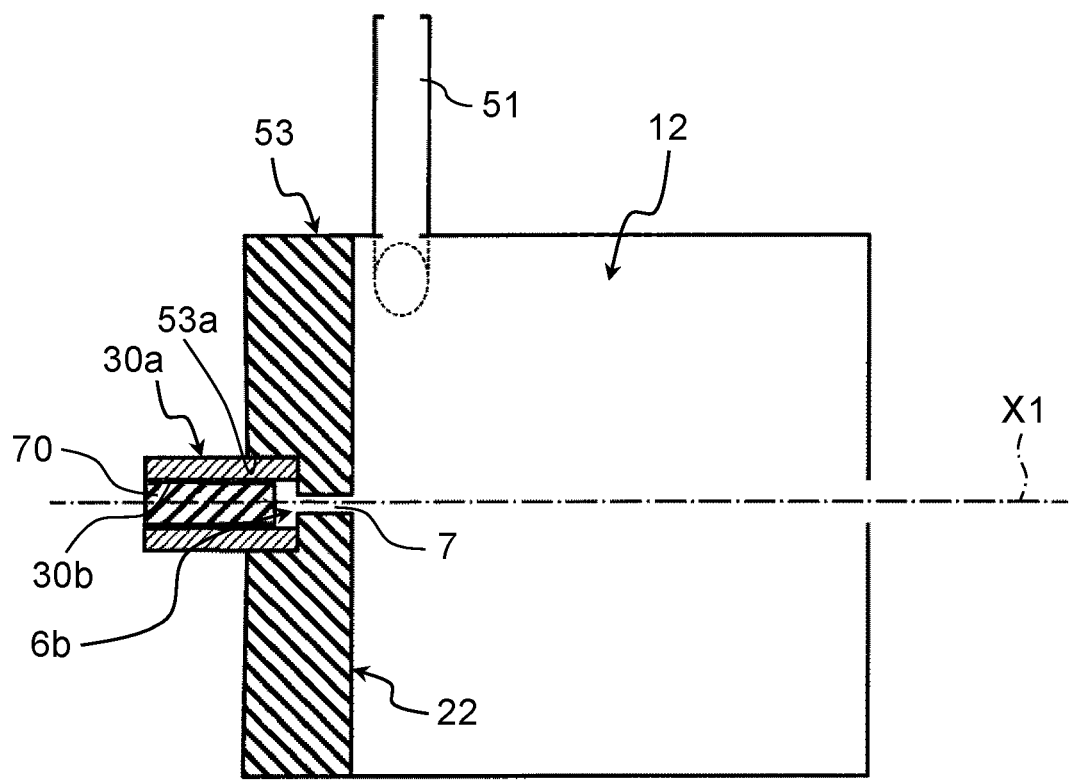
FIG. 10 is a side sectional view illustrating another modification example of the first electrode.
Figure 10:
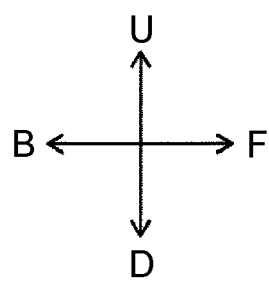

FIG. 10 is a side sectional view illustrating a modification example in which the shape of first electrode 30 is changed to cylindrical first electrode 30a. FIG. 10 is a side sectional view illustrating a modification example in which first electrode 30 can be configured without being disposed on the axis of central axis X1. Columnar recessed portion 53a having a diameter larger than the inner diameter of through-hole 7 is formed in the opening of a side of the first end portion of through-hole 7 of insulator 53. An end portion of a side of the second end portion of cylindrical first electrode 30a is fitted and fixed to cylindrical recessed portion 53a. The tip of through-hole 30b of cylindrical first electrode 30a is closed by cylindrical body 70 of the insulator and columnar space 6b is formed on a side of the second end portion of through-hole 30b of cylindrical first electrode 30a. The inner diameter of columnar space 6b is larger than the inner diameter of through-hole 7.

With such a configuration, it is possible to prevent the wear of first electrode 30a from concentrating near central axis X1.

Figure 11:
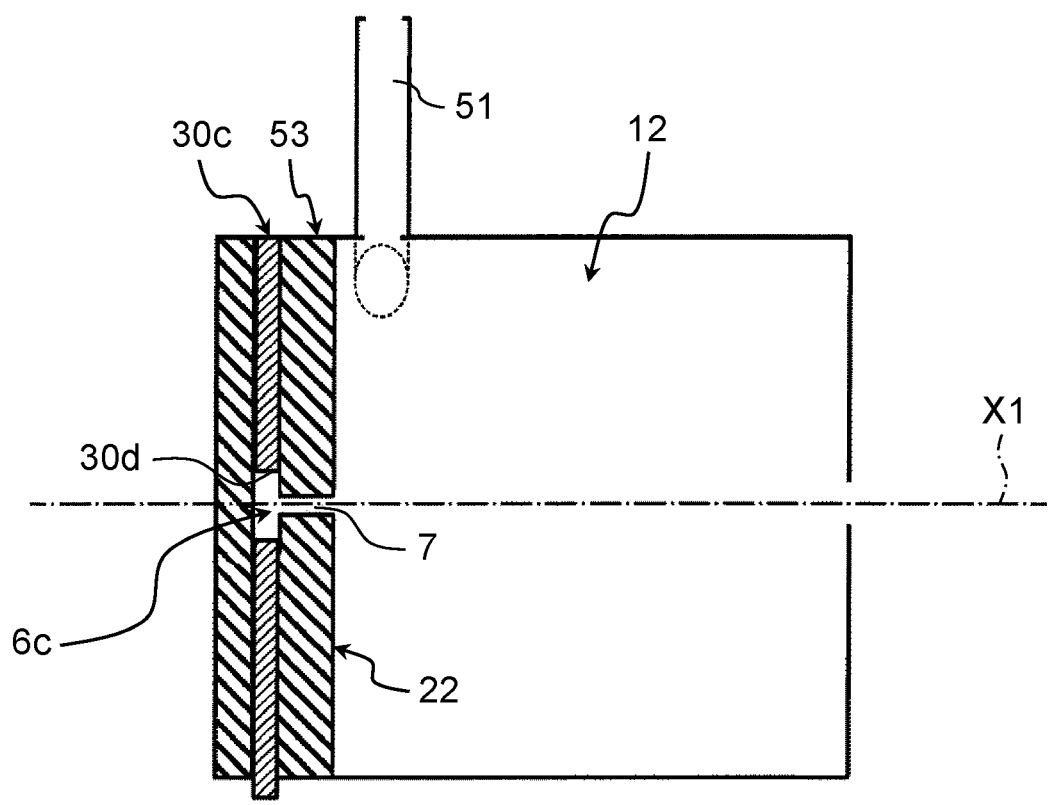
FIG. 11 is a side sectional view illustrating another modification example of the first electrode and a space.
Figure 11:
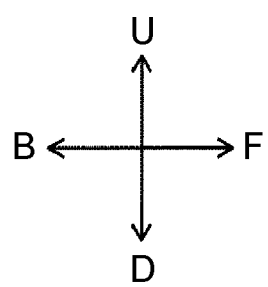

FIG. 11 is a side sectional view illustrating a modification example of first electrode 30c in which the shape of first electrode 30 is changed to a sheet shape. First electrode 30c is a circular sheet shape interposed and fixed in the middle in the thickness direction of insulator 53, and circular hole 30d having an inner diameter larger than the inner diameter of through-hole 7 is penetrated in the center, and thus space 6c is formed.

With such a configuration, it is possible to prevent the wear of first electrode 30c from concentrating in the vicinity of central axis X1.

Figure 12:
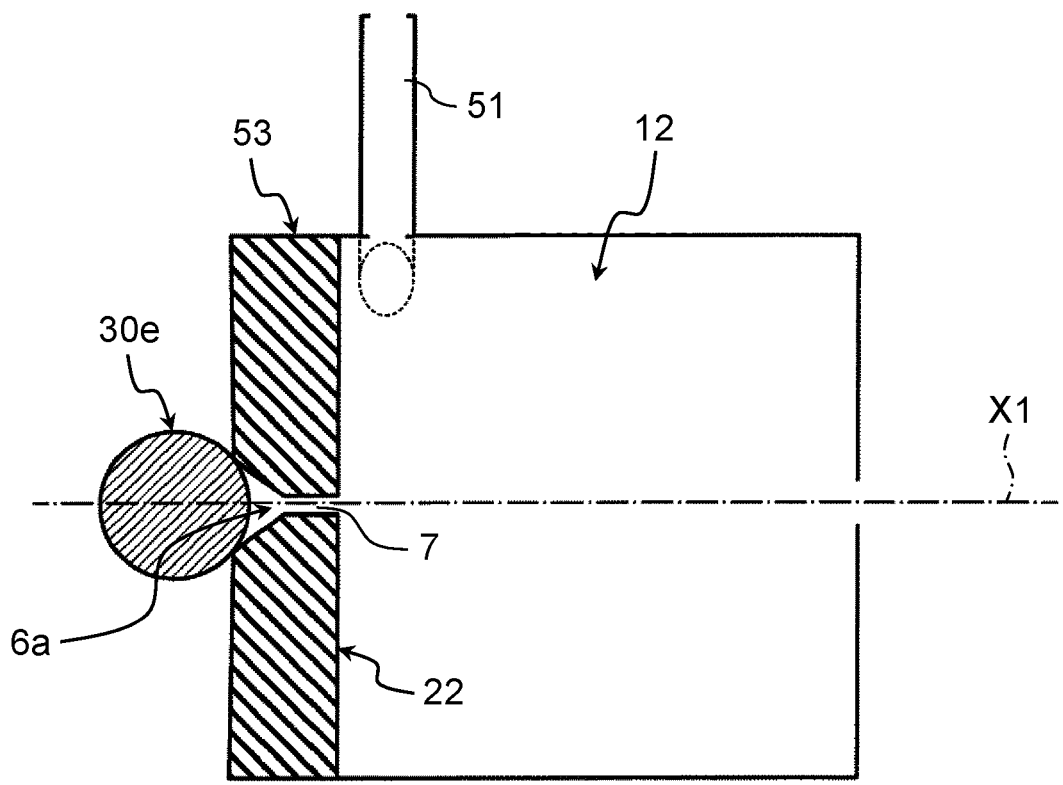
FIG. 12 is a side sectional view illustrating another modification example of the first electrode and a space.
Figure 12:
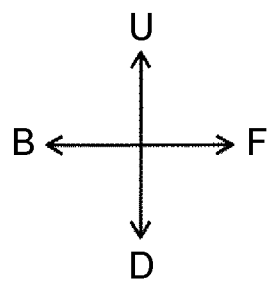

FIG. 12 is a side sectional view illustrating a modification example in which the shape of first electrode 30 is changed from a disk shape to first spherical electrode 30e in the example of FIG. 9. The opening on a side of the first end portion of conical space 6a at the spherical surface of first spherical electrode 30e is closed. First spherical first electrode 30e can include a rotation device such as a motor which rotates first spherical electrode 30e as an example of a moving device that moves first electrode 30e with respect to insulator 53 while being pressed into contact with insulator 53 forming space 6a.

According to such a configuration, if first spherical electrode 30e is rotated while being pressed into contact with insulator 53, it is possible to always discharge on the new electrode surface.

Figure 13:
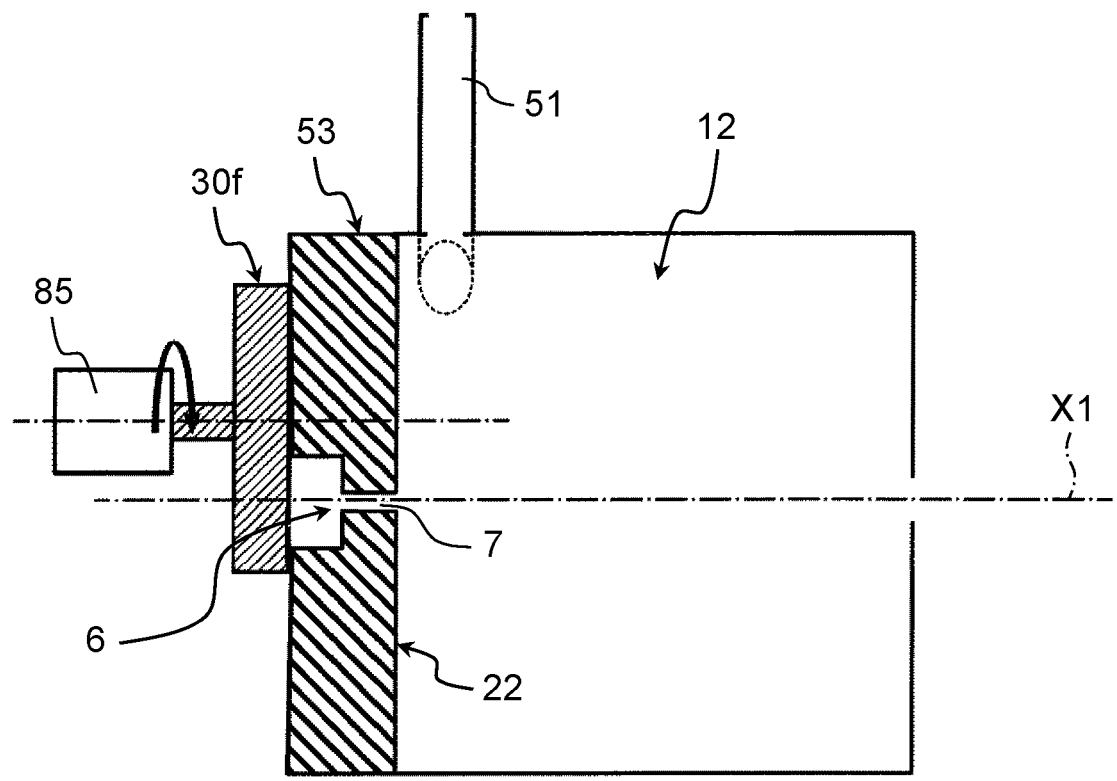
FIG. 13 is a side sectional view illustrating a modification example of a mechanism for rotating the first electrode.
Figure 13:
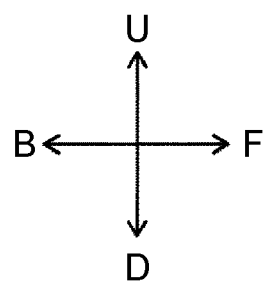

FIG. 13 is a side sectional view illustrating a modification example in which first electrode 30 is configured as first disk-shaped electrode 30f having a diameter smaller than the diameter of disk-shaped insulator 53. The rotation center of the disk is at a position distant from the axis of central axis X1 and by rotating first disk-shaped electrode 30f by rotation device 85 such as a motor as another example of the moving device, it is possible to always discharge on the new electrode surface.

Figure 14:
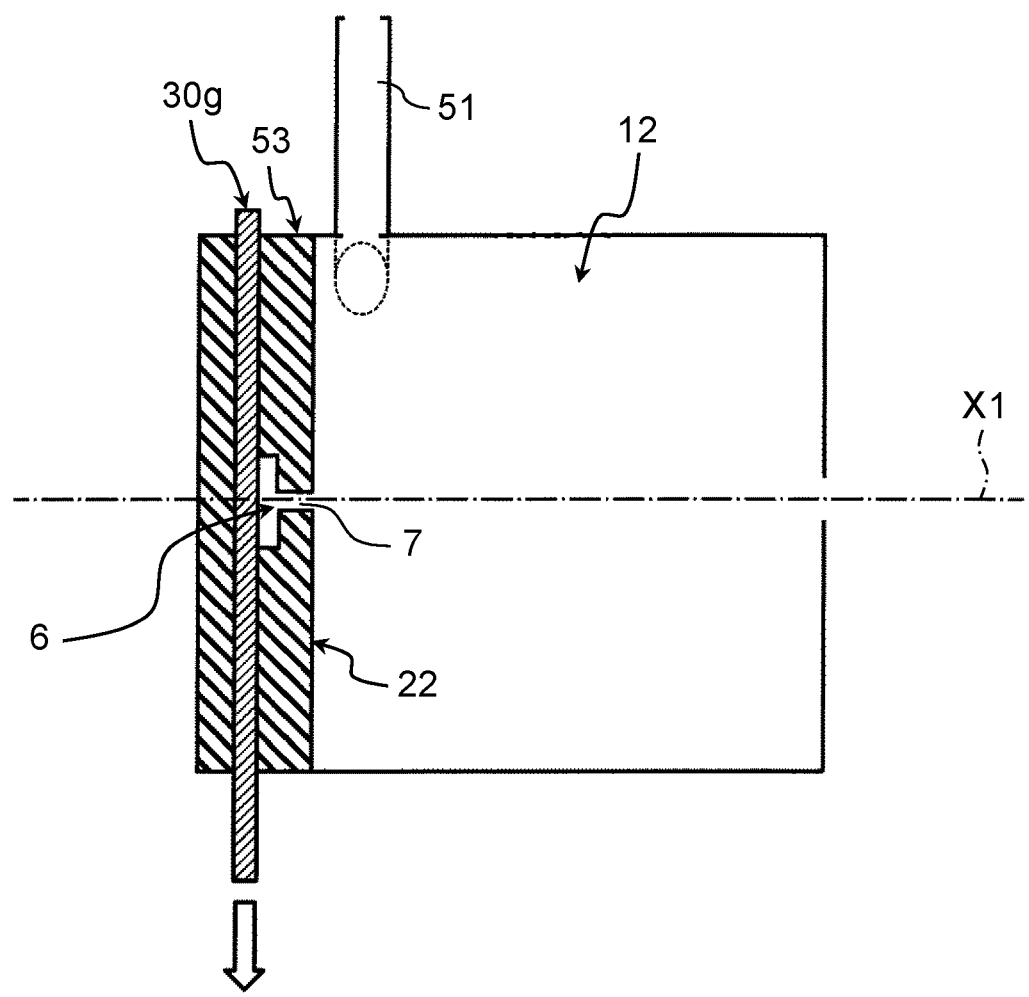
FIG. 14 is a side sectional view illustrating a modification example of a mechanism for forming and pulling out a first electrode in a band shape.
Figure 14:
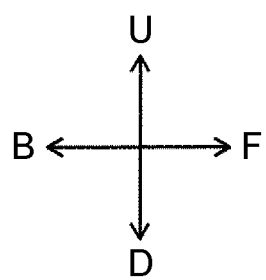

FIG. 14 is a side sectional view illustrating a modification example in which first electrode 30 is configured as ribbon-shaped first electrode 30g. By ribbon-like first electrode 30g covering a columnar, disk-like or conical space 6 is wound and moved around insulator 53 by a winding device having a roller as another example of a moving device, it is possible to always discharge on the new electrode surface.

Figure 15:
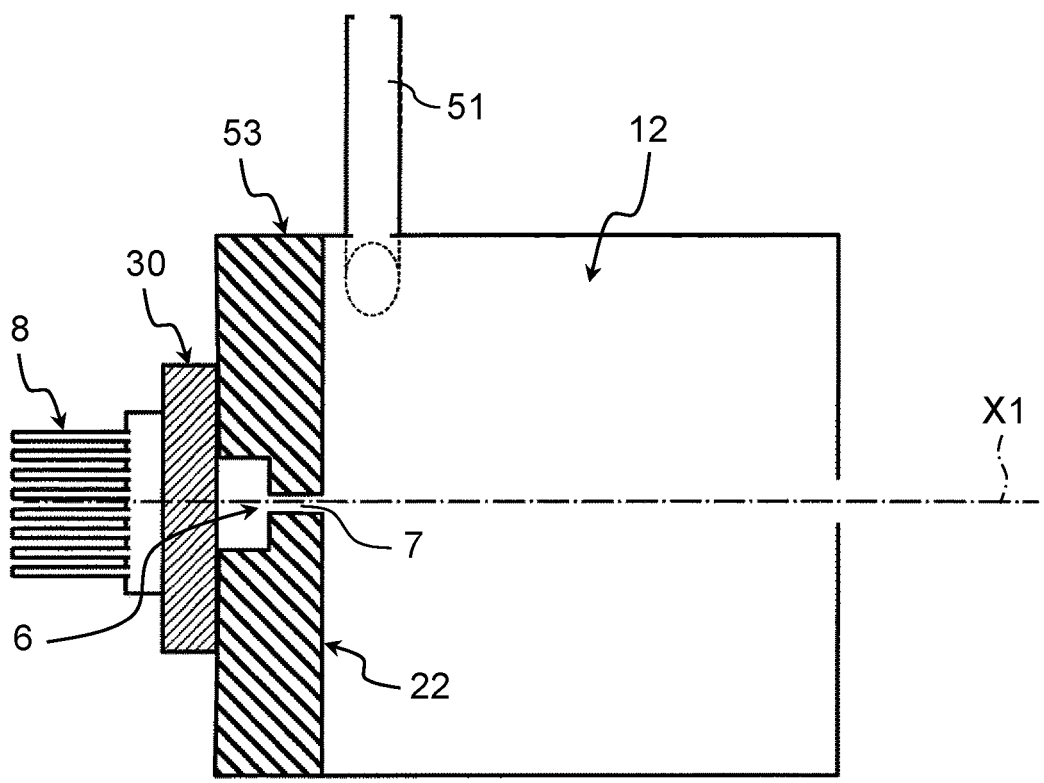
FIG. 15 is a side sectional view illustrating a modification example in which a mechanism for heat-radiating and cooling the first electrode is added.
Figure 15:
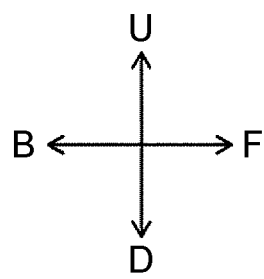

FIG. 15 is a side sectional view illustrating a modification example in which heat-radiation and cooling mechanism 8 having, for example, a large number of heat-radiation fins is attached in contact with the rear surface of first electrode 30. By heat-radiating and cooling first electrode 30 by heat-radiation and cooling mechanism 8, it is possible to stably discharge and prevent consumption of the electrode.

Figure 16:
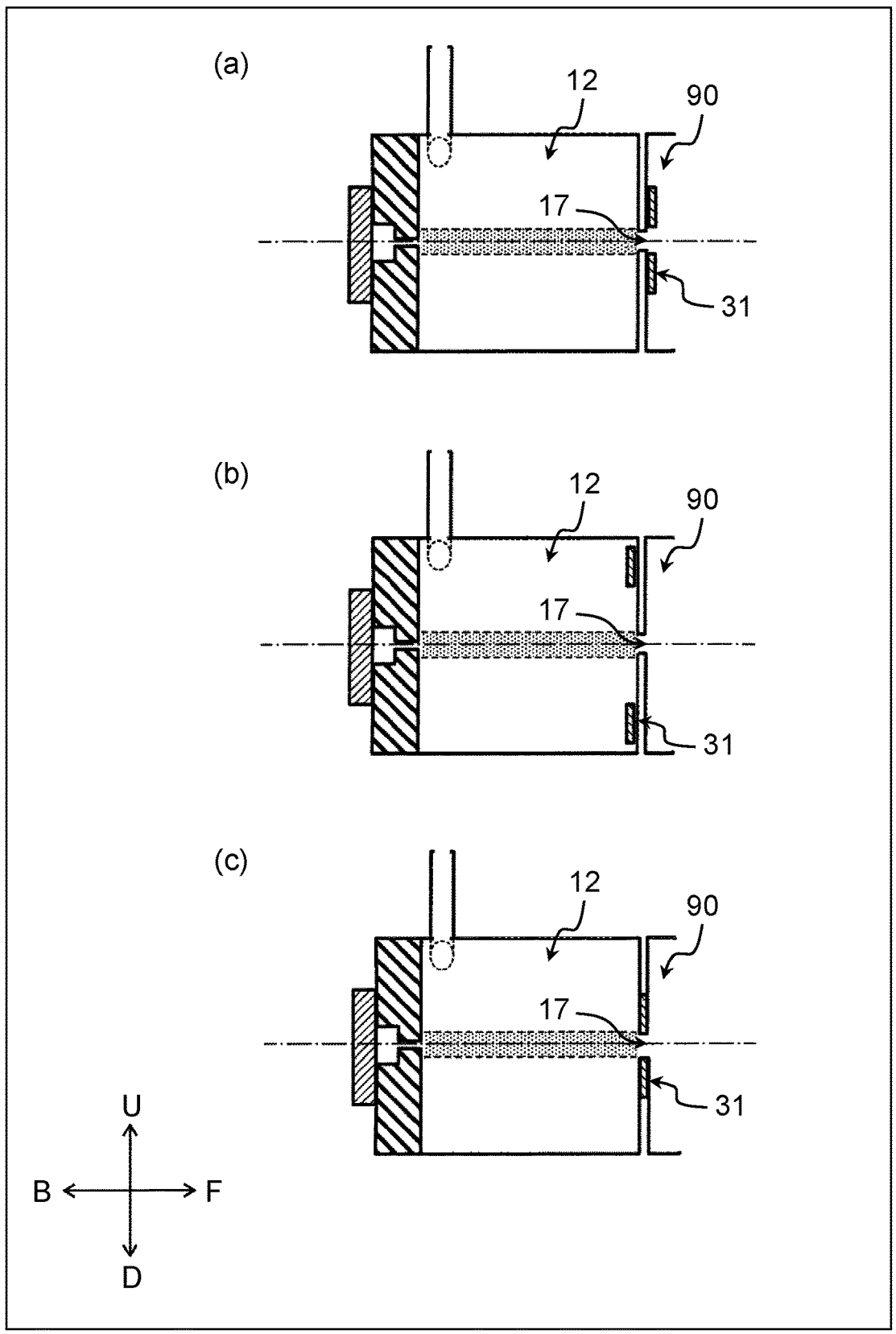
FIG. 16 is a side sectional view illustrating an installation example of a second electrode.
Figure 17:
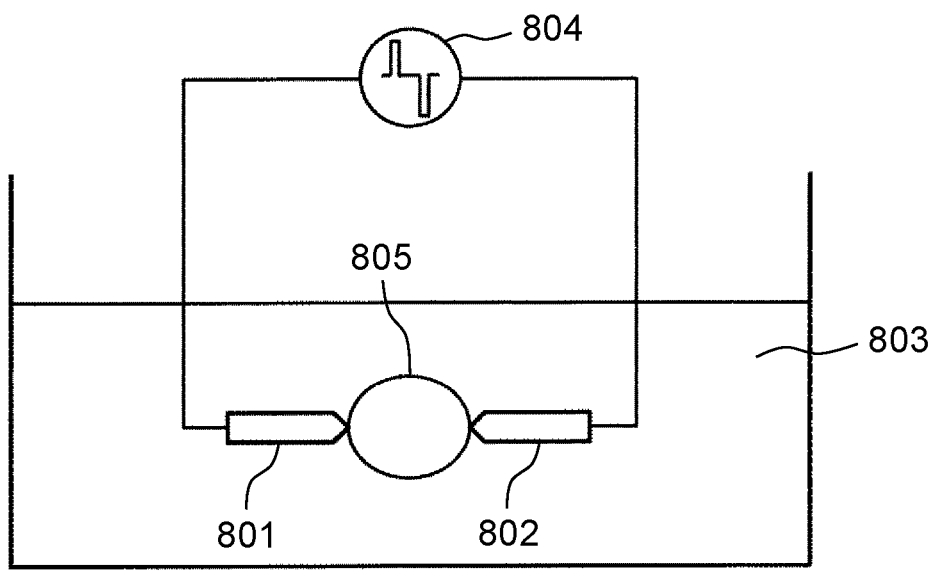
FIG. 17 is a sectional view of a conventional liquid treatment apparatus.
Figure 18:
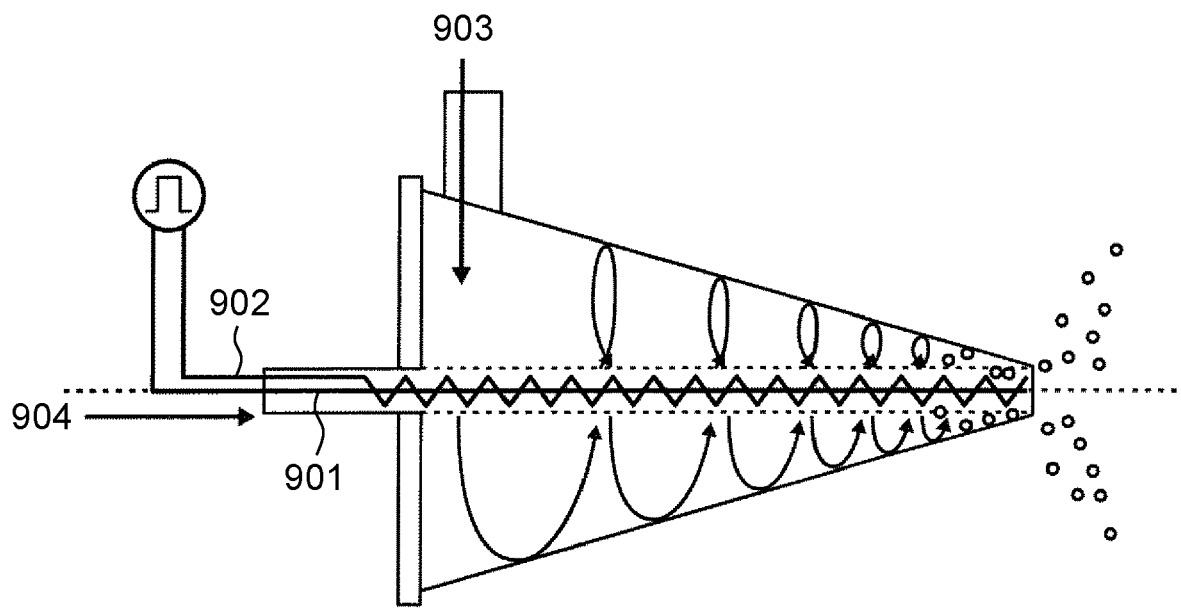
FIG. 18 is a view for explaining the conventional liquid treatment apparatus including a gas introduction device.
Figure 18:
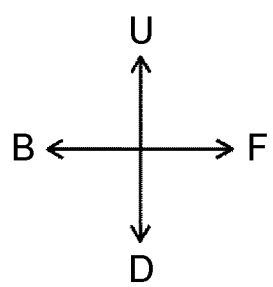

FIG. 16 is a side sectional view illustrating a modification example of the configuration position of second electrode 31. As long as it is not related to the generation of gas phase G, it may be disposed in storage tank 90 as illustrated in (a) of FIG. 16. In addition, as illustrated in (b) of FIG. 16, it may be fixed to third inner wall 23 of treatment tank 12. Further, as illustrated in (c) of FIG. 16, it may be disposed between treatment tank 12 and storage tank 90.

In addition, although the shape of second electrode 31 is assumed to be a toroidal disk in this example, it may simply be a flat plate or a bar shape. It is desirable that the installation position of the second electrode is close to discharge unit 17 which is the terminal position of gas phase G.

In such a configuration, the disposition of second electrode 31 is not greatly restricted. If second electrode 31 is near central axis X1, the resistance of water becomes low, which is a preferable form.

The configuration of liquid treatment apparatus 100 described in this Exemplary embodiment and the modification example is an example, and various modifications are possible. For example, the internal structure of treatment tank 12, the position of first electrode 30 or second electrode 31, and the like are not limited to the structures of this Exemplary embodiment and the modification examples.

As described above, although the Exemplary embodiments and modifications of the disclosure have been described above, the Exemplary embodiments and modifications described above are merely examples for implementing the disclosure. Therefore, the disclosure is not limited to the above-described Exemplary embodiments and modifications, and it is possible to appropriately modify and implement the Exemplary embodiment and modification examples described above within the scope not deviating from the gist thereof.

For example, by combining any of Exemplary embodiments or modification examples of the various Exemplary embodiments or modification examples, it is possible to achieve the effect each of them has. In addition, combinations of the Exemplary embodiments, combinations of the examples or modification examples, or combinations of the Exemplary embodiments and the examples or modification examples are possible and combinations of features in different Exemplary embodiments, examples, or modification examples are also possible.

INDUSTRIAL APPLICABILITY

Therefore, the liquid treatment apparatus according to the aspect of the disclosure can treat liquid by simultaneously causing a decomposing and sterilizing action by generating plasma in the liquid and pollutants or bacteria contained in the liquid directly coming in contact with the plasma and a decomposing and sterilizing action by ultraviolet rays, radicals, and the like generated by plasma discharge. Therefore, this liquid treatment apparatus according to the aspect of the disclosure can be used for sterilization, deodorization, various environmental improvement, or the like.

REFERENCE MARKS IN THE DRAWINGS

100 LIQUID TREATMENT APPARATUS
6, 6a, 6b, 6c SPACE
7 THROUGH-HOLE
8 HEAT-RADIATION AND COOLING MECHANISM
10 APPARATUS MAIN BODY
12 TREATMENT TANK
15 INTRODUCTION PORTION (LIQUID INTRODUCTION PORT)
17 DISCHARGE UNIT
21 FIRST INNER WALL
22 SECOND INNER WALL
23 THIRD INNER WALL
30, 30a, 30c, 30e, 30f FIRST ELECTRODE
30b THROUGH-HOLE
30d HOLE
31 SECOND ELECTRODE
50 LIQUID SUPPLIER
51 PIPE
53a INSULATOR (SPACE FORMING MEMBER)
60 POWER SUPPLY
70 COLUMNAR BODY
81 PIPE FOR CIRCULATION
83 ACCOMMODATION SPACE
85 ROTATION DEVICE
90 STORAGE TANK
301 RIGHT END PORTION
311 OPENING PORTION
d1 DIAMETER
d2 DIAMETER
L1 LIQUID
L2 TREATMENT LIQUID
E ELECTRIC FORCE LINE
G GAS PHASE
P PLASMA
801 FIRST ELECTRODE
802 SECOND ELECTRODE
803 LIQUID
804 PULSE POWER SUPPLY
805 PLASMA
901 ANODE ELECTRODE
902 CATHODE ELECTRODE
903 TREATMENT LIQUID
904 GAS

The invention claimed is:

1. A liquid treatment apparatus comprising:
a tubular treatment tank of which a sectional shape orthogonal to a central axis is a circular shape;
an insulating space forming member which is disposed at a side of one end of the central axis of the treatment tank and has a through-hole and a space connected to the treatment tank via the through-hole;
a first electrode which is disposed in contact with the space;
a second electrode which is disposed on a side of the other end of the central axis of the treatment tank;
a power supply configured to apply a voltage between the first electrode and the second electrode;
a liquid introduction port configured to swirl liquid in the treatment tank by introducing the liquid from a tangential direction of the circular shape of the treatment tank, and generate a gas phase in a swirling flow of the liquid; and
a moving device configured to move the first electrode with respect to the space forming member while contacting the first electrode with the space by bringing the space forming member in contact with the first electrode,
wherein plasma is generated in the gas phase reaching the space and the through-hole, thereby causing the liquid to generate as a treatment liquid, by applying the voltage from the power supply between the first electrode and the second electrode.

2. The liquid treatment apparatus of claim 1,
wherein an inner diameter of the through-hole is 25% or more to 50% or less of a diameter of the gas phase, and
wherein a length of the through-hole in a direction of the central axis is 0.5 mm or more and 3 mm or less.

3. The liquid treatment apparatus of claim 2,
wherein a length of the space in a direction of the central axis is 0.5 mm or more and 3 mm or less, and
wherein an inner diameter of the space is larger than the inner diameter of the through-hole and is 1 mm or more and 3 mm or less.

4. The liquid treatment apparatus of claim 3, further comprising:
a heat-radiation and cooling mechanism which is disposed in contact with the first electrode, and heat-radiates and cools the first electrode.

5. The liquid treatment apparatus of claim 2, further comprising:
a heat-radiation and cooling mechanism which is disposed in contact with the first electrode, and heat-radiates and cools the first electrode.

6. The liquid treatment apparatus of claim 1,
wherein a length of the space in a direction of the central axis is 0.5 mm or more and 3 mm or less, and wherein an inner diameter of the space is larger than an inner diameter of the through-hole and is 1 mm or more and 3 mm or less.

7. The liquid treatment apparatus of claim 1, further comprising:
   a heat-radiation and cooling mechanism which is disposed in contact with the first electrode, and heat-radiates and cools the first electrode.

* * * * *